(12) United States Patent
Kuppa et al.

(10) Patent No.: US 10,977,374 B1
(45) Date of Patent: Apr. 13, 2021

(54) METHOD TO ASSESS INTERNAL SECURITY POSTURE OF A COMPUTING SYSTEM USING EXTERNAL VARIABLES

(71) Applicant: CA, INC., San Jose, CA (US)

(72) Inventors: Aditya Kuppa, Dublin (IE); Pierre-Antoine Vervier, Cagnes-sur-Mer (FR); Slawomir Grzonkowski, Dublin (IE); Yun Shen, Bristol (GB)

(73) Assignee: CA, Inc., San Jose, CA (US)

( * ) Notice: Subject to any disclaimer, the term of this patent is extended or adjusted under 35 U.S.C. 154(b) by 279 days.

(21) Appl. No.: 16/010,121

(22) Filed: Jun. 15, 2018

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .................. G06F 21/577; G06F 2221/034
See application file for complete search history.

(56) References Cited

U.S. PATENT DOCUMENTS

| 9,798,876 | B1* | 10/2017 | Parker-Wood | G06F 21/554 |
| 2016/0350539 | A1* | 12/2016 | Oberheide | H04L 63/20 |
| 2017/0208084 | A1* | 7/2017 | Steelman | H04L 63/1491 |
| 2020/0028871 | A1* | 1/2020 | Thayer | H04L 63/20 |

* cited by examiner

*Primary Examiner* — Kevin Bechtel
*Assistant Examiner* — Hamid Talaminaei
(74) *Attorney, Agent, or Firm* — FisherBroyles, LLP

(57) ABSTRACT

Methods and systems are provided for generating a security profile for a new computing system. One example method generally includes obtaining, over a network, information associated with a plurality of existing computing systems and generating, by a clustering algorithm, a set of clusters based on the information associated with the plurality of existing computing systems. The method further includes obtaining external data associated with the computing system and classifying the computing system into a cluster in the set of clusters based on the external data associated with the computing system. The method further includes determining the security profile based on statistics associated with the cluster and transmitting, over the network, an indication of the security profile.

20 Claims, 5 Drawing Sheets

METHOD TO ASSESS INTERNAL SECURITY POSTURE OF A COMPUTING SYSTEM USING EXTERNAL VARIABLES

BACKGROUND

Field

Embodiments of the present invention generally relate to estimating security details for computing systems, and more particularly to using externally available information to estimate security details for computing systems.

Description of the Related Art

Full assessments of security vulnerabilities of a computing system, such as a computing system maintained by a particular company, may be desired in order to make informed decisions related to the computing system. For example, in the case of cyber insurance (policies provided to insure against damage caused by malware or other cyber-security attacks) an underwriter of a cyber insurance policy may be able to make use of a comprehensive security report of a company seeking a cyber insurance policy. Unfortunately, without administrative access to a computing system, there may be no direct way to collect comprehensive information about the computing system.

In some cases, it may be possible to indirectly estimate or collect security information about a computing system. In the case of cyber insurance, a questionnaire may be provided to an administrator of the computing system. However, answers to the questionnaire may be misleading or untrue, and there may be no way to verify such answers, making security information so obtained unreliable.

It may also be possible to broadly estimate details of a computing system by comparison with other companies of a similar type. For example, known security information of companies in a particular industry may be used to estimate security information for other companies in the industry. Other groupings of companies may include market grouping or sector grouping. However, such groupings may be imprecise and may lead to grouping of companies which have little in common with one another. For example, a large restaurant chain may be grouped together with a restaurant with a single location based on being in the food service industry, but the computing systems of the chain and the restaurant may have few similarities in terms of cyber security risk. Thus, existing estimates of computing system security details without using information provided by an owner or operator of the computing system are inadequate. Therefore, enhanced systems and methods are needed to perform a thorough analysis of a computing system without such information.

SUMMARY

One embodiment of the present disclosure provides a method for generating a security profile for a computing system. The method generally includes obtaining, over a network, information associated with a plurality of existing computing systems and generating, by a clustering algorithm, a set of clusters based on the information associated with the plurality of existing computing systems. The method further includes obtaining external data associated with the computing system and classifying the computing system into a cluster in the set of clusters based on the external data associated with the computing system. The method further includes determining the security profile based on statistics associated with the cluster and transmitting, over the network, an indication of the security profile.

Another embodiment is a computing device. The computing device includes a processor and a memory coupled to the processor. The memory has instructions stored thereon which, when executed by the processor, perform operations for generating a security profile for a computing system. The operations generally include obtaining, over a network, information associated with a plurality of existing computing systems and generating, by a clustering algorithm, a set of clusters based on the information associated with the plurality of existing computing systems. The operations further include obtaining external data associated with the computing system and classifying the computing system into a cluster in the set of clusters based on the external data associated with the computing system. The operations further include determining the security profile based on statistics associated with the cluster and transmitting, over the network, an indication of the security profile.

Still another embodiment is a non-transitory computer-readable medium having instructions stored thereon which, when executed by a processor of a computing device, perform operations for generating a security profile for a computing system. The operations generally include obtaining, over a network, information associated with a plurality of existing computing systems and generating, by a clustering algorithm, a set of clusters based on the information associated with the plurality of existing computing systems. The operations further include obtaining external data associated with the computing system and classifying the computing system into a cluster in the set of clusters based on the external data associated with the computing system. The operations further include determining the security profile based on statistics associated with the cluster and transmitting, over the network, an indication of the security profile.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
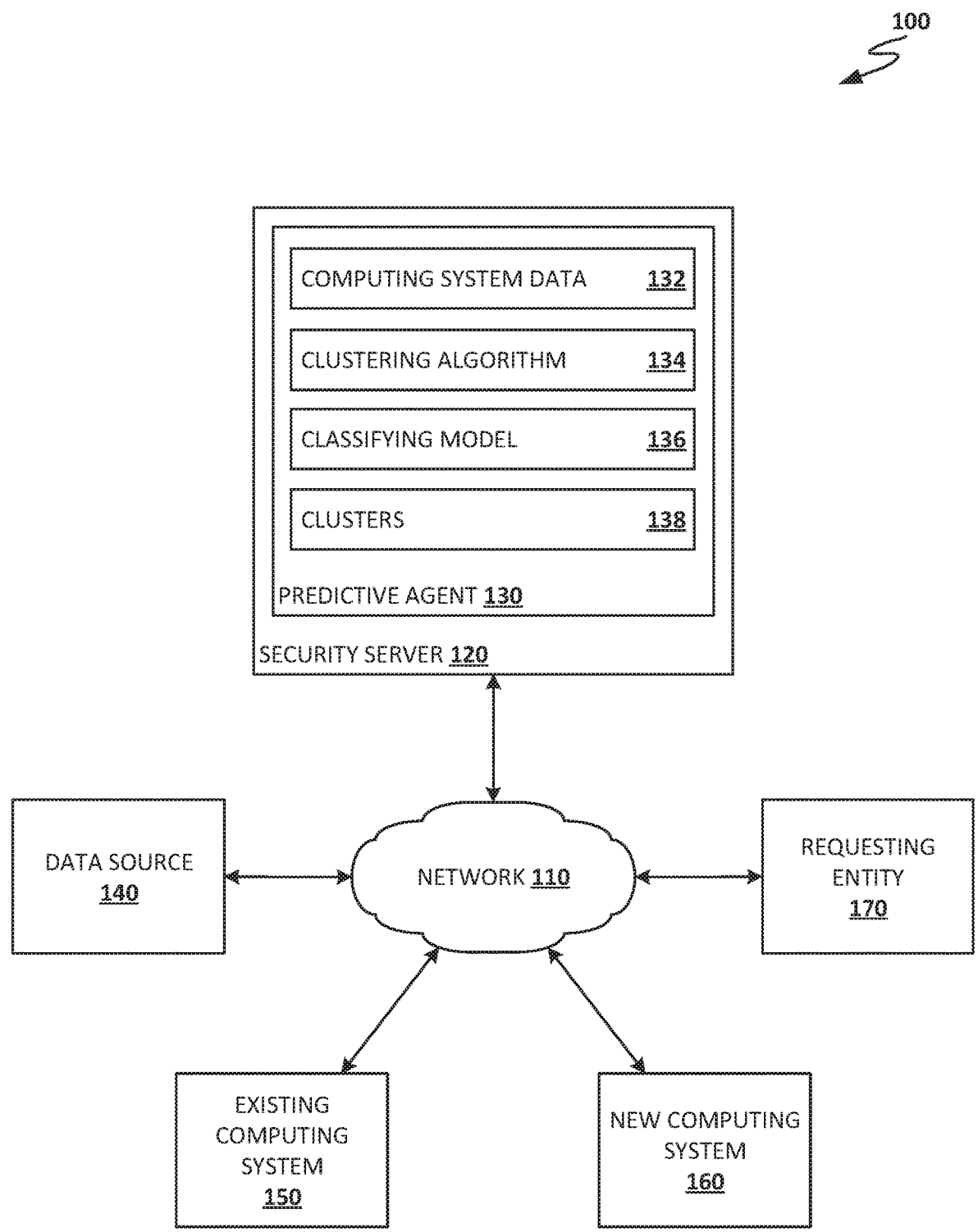
FIG. 1 is a block diagram of an example computing environment in which systems of the present disclosure may operate, according to an embodiment of the present disclosure.

An assessment of security issues of a computing system may generally involve scrutinizing security vulnerabilities of the computing system, such as an attack surface of the computing system. An attack surface generally refers to a complete set of points where an attacker can attempt to penetrate a computing system. In order to make assessments of security issues for a computing system (such as a computing system operating by a particular company or an enterprise computing system) various sources of information may be used, including information available generally to anyone (external data or externally observable data) and information available only to those with administrative or operational access to the computing system (internal data, such as an internal security posture). An assessment of security issues may be better if the assessment is prepared with both types of information. However, access to internal data may often be restricted. Security assessments may therefore rely on estimates for internal data. The quality of security assessments may thus be dependent on the quality of the estimates for internal data.

Existing estimates for internal data may be inadequate to fully prepare a suitable assessment. Generally, existing methods for preparing estimates rely on broadly grouping types of computing systems together. For example, to estimate internal data for a large company's computing system, existing methods may simply use known internal data for a company of a comparable size (e.g., in terms of number of employees or average yearly revenue). These methods are imprecise as such methods rely on information that may not provide a complete picture of a computing system. Other methods which distinguish computing systems on other grounds (such as an industry of a company) may provide similarly inaccurate results for the same reasons. In some cases, an entity requesting internal data may in fact be interested in only one particular metric of internal data. For such a case, the existing methods may be unable to provide the metric, as those methods may only be able to broadly compare different computing systems.

The present disclosure relates to systems and methods for assessing security issues or vulnerabilities of a computing system using only external data, which provides more accurate results than the existing methods described above. The systems and methods may comprise an extensible framework to estimate the internal security posture of a computing system. First, information may be collected from a plurality of existing computing systems including internal data and external data. Generally, internal data and external data are collections of individual metrics (e.g., security parameters) for a computing system. Internal data may be available, for example, for computing systems that have security managed by an entity attempting to estimate internal security metrics for other computing systems.

The collected information may be used to create a plurality of clusters of computing systems, meaning organizing each computing system into a group of other computing systems based on similarities in the collected information. Then, statistics for each collected metric of the internal and external data may be computed for each cluster. For example, a value for each metric may be collected from each computing system in a given cluster. These values may be used to calculate an average value for each metric across the cluster. The process of collecting information of existing computing systems and generating clusters may be repeated on a regular basis (e.g., monthly, quarterly, biannually, etc.) or intermittently in order to keep the clusters up to date with changes to the existing computing systems.

A request to estimate internal data of a new computing system, such as a particular metric of internal data, may thereafter be received. In response to the request, external data of the new computing system may be obtained. Using this information, the new computing system may be classified to a particular cluster of the previously generated clusters. Then, using the previously calculated statistics for the particular cluster, an estimate of the internal data for the new computing system may be generated. The estimate of the internal data (or a particular metric thereof) may be returned in response to the request, or a complete security profile of the new computing system (including the obtained external data) may be returned in response to the request.

The above methods may be used by a cyber insurance platform to improve estimates for internal data associated with computing systems. A cyber insurance platform may be a service offered to provide insurance against cyber-attacks. Better estimates of internal data may allow the cyber insurance platform to make a better assessment of a computing system and thus improve the quality of cyber insurance policies.

FIG. 1 is a block diagram of an example computing environment 100 in which systems of the present disclosure may operate, according to an embodiment of the present disclosure. Computing environment 100 includes security server 120, data source 140, existing computing system 150, new computing system 160, and requesting entity 170, all connected via network 110 (e.g., the Internet).

Security server 120 includes predictive agent 130, which in turn includes computing system data 132, clustering algorithm 134, classifying model 136, and clusters 138. In computing environment 100, predictive agent 130 is an application executing on security server 120, while in other embodiments, the functions of predictive agent 130 may be distributed across a plurality of applications executing on computing devices. Predictive agent 130 may be used to estimate internal data for new computing systems, and to generate security profiles for new computing systems based in part on information of computing systems already known to predictive agent 130. These computing systems already known to predictive agent 130 may be referred to as "existing computing systems" to differentiate from new computing systems.

As part of a process of generating security profiles, predictive agent 130 may create clusters 138 to facilitate assessment of new computing systems, such as new computing system 160. Predictive agent 130 may collect information related to a plurality of existing computing systems, such as existing computing system 150, in order to create clusters 138. Computing systems, such as existing computing system 150 and new computing system 160, are groups of one or more computing devices operated or maintained by a single entity. For example, a computing system may be operated and maintained by a business organization. Such a computing system may also be referred to as an enterprise computing system. Computing systems may include administrator devices, user (or employee) devices, servers, networking appliances, and/or any other computing devices that are part of a single computing network. For simplicity in this example, one existing computing system is shown in computing environment 100, but generally a plurality of existing computing systems may be accessible via network 110. The information collected is stored on security server 120 as computing system data 132.

Predictive agent 130 may collect computing system data 132 related to existing computing system 150 either directly from existing computing system 150 or indirectly from data source 140. Data source 140 may be any suitable non-volatile data store for organizing and storing data with software making stored data available via network connections. In some embodiments, data source 140 may be implemented as one or more storage devices, such as one or more hard disks, flash memory modules, solid state disks, or optical disks (e.g., in a computing device, server, etc.). In this example, one known data source is shown in computing environment 100, but in other examples a plurality of data sources may be accessible via network 110, each having computing system data related to one or more computing systems. Although security server 120 and data source 140 are shown as separate entities in the example of FIG. 1, in other embodiments the functions of data source 140 and security server 120 may be performed by a single entity. Data source 140 may collect information associated with existing computing system 150 and provide this information to predictive agent 130. Data source 140 may additionally collect and provide information associated with new computing system 160 for the same purpose.

Data sources in use in computing environment 100 may comprise a plurality of services recording data received as reports from endpoints in a network. In this context, data sources may represent a central data center. For example, malicious network activity or malicious file activity may be reported by an agent executing on an endpoint to a data center or central server of the agent. Potential data sources for use in computing environment 100 may store information related to endpoint reputation, behavior, network usage, or other types of statistics. As examples, one data source may record instances of queries for a reputation for a file from an agent executing on an endpoint, while another data source may record instances of malicious files being blocked by the agent. Other data sources may record instances of malicious network traffic being blocked by the agent or record instances of malicious executions being blocked by the agent.

Elements of computing system data 132 may be individually categorized as external data or internal data. Generally, both external and internal data are collected from existing computing systems. External data may include two groups of data, external security metrics and business metrics, while internal data is a single group of internal security metrics. External security metrics may refer to security details of the computing system viewable outside of the computing system. Internal security metrics may refer to security details viewable only inside the computing system. Business metrics may refer to business or company characteristics of the entity or company which owns or operates the computing system.

External security, business, and internal security metrics may each be a set of individual metrics relating to security of a computing system. An example of an external security metric is port profiles of the computing system, which are visible to those outside the computing system. An example of a business metric is a physical location of a business owning the computing system, which is also visible to those outside the computing system. An example of an internal security metric is a count of potential installations of hacking tools, which may only be visible to those inside (e.g., with administrative access to) the computing system.

After receiving computing system data 132, predictive agent 130 may use computing system data 132 to generate clusters 138. A clustering algorithm (e.g., a computer-implemented algorithm used to cluster data points together) may be used to assign each existing computing system of the plurality of existing computing systems to a single cluster of computing systems. Each individual cluster of clusters 138 may have statistics calculated for the cluster. Predictive agent 130 may collect each metric of external security, business, and internal security metrics for each computing system of a cluster. These collected metrics may be used to generate, for example, an average value for each metric across the cluster. Other statistics generated for each metric may include median, standard deviation, outlier score, and probability of occurrence for the metric.

After generating clusters 138, security server 120 may receive from requesting entity 170 a request for a security profile of new computing system 160. Requesting entity 170 is a computing device sending a request for estimates of internal data from security server 120. As an example, requesting entity 170 may be a computing device operated by an insurance agent, or a server automatically generating a request on behalf of a cyber insurance platform. Upon receiving the request, predictive agent 130 may collect external data of new computing system 160. Predictive agent 130 may use this external data as input to a classification model (e.g., a machine learning model trained to classify data points into existing categories). The classification model may use the external data to identify a cluster of clusters 138 to which new computing system 160 corresponds. Predictive agent 130 may then obtain cluster statistics for internal data of the cluster. Generally, the cluster statistics for a given cluster may provide good estimates of internal data for a new computing system assigned to the given cluster. The cluster statistics may be used to prepare a security profile for new computing system 160, which may then be transmitted to requesting entity 170.

In some cases, requesting entity 170 may request, rather than a security profile for new computing system 160, an estimate of a single internal security metric for new computing system 160. In such a case, predictive agent 130 may perform substantially the same process, but may provide only a single element (corresponding to the single internal security metric requested) of the cluster statistics associated with new computing system 160.

Figure 2A:
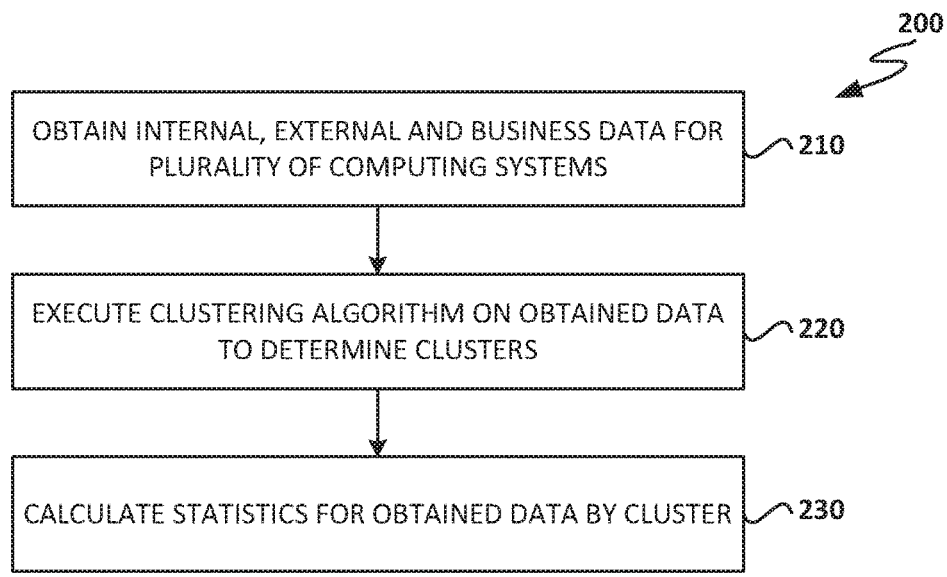
FIG. 2A illustrates an example process for generating statistics for a cluster, according to an embodiment of the present disclosure.

FIG. 2A illustrates an example process 200 for generating cluster statistics, according to an embodiment of the present disclosure. Process 200 begins at operation 210, where internal, external, and business data for a plurality of computing systems are obtained. When obtained, internal data may be normalized by a number of active endpoints in the pool of collected data. External data may be normalized by a number of active domains operated by the computing system, and further normalized by an amount of Internet Protocol (IP) space operated by the computing system. Normalizing internal and external data may prevent classifications of computing systems that are over-reliant on the size of the computing system.

Any of various suitable metrics may be utilized for each of internal, external, and business data. For example, metrics of internal data may include counts of hacking tools, including general purpose tools, research and help desk tools, and suspicious and penetrating testing tools. General purpose tools may, for example, be tools that are found on endpoints of a computing system and that can be used by an attacker for malicious activity. Research and help desk tools may, for example, be tools that are generally used by an administrator, an analyst, a developer, or a help desk of the computing system. Research and help desk tools may, for example, be legitimate applications, but some advanced threats may incorporate such tools in their attacks. Suspicious and penetrating testing tools may, for example, be tools that are generally used by pen testers and attackers. These may include applications that are either directly attack-related or can help the attacker achieve more using other categories of tools.

Other metrics of internal data may include an effectiveness of remediation efficiency, typical remediation time in response to attacks, hygiene and blocking effectiveness, potential client-side vulnerabilities, readiness of response to security incidents, and a patch profile. Remediation efficiency may, for example, be a percentage of infections or threats deleted from the computing system on a first day of detection. Typical remediation time may, for example, be a difference between the first seen time of the infection on a computer and the last seen time of that infection in a period of aggregation. Hygiene and blocking effectiveness may, for example, give a general indication of how for a given period (e.g., a month) malware and web-based attacks are removed and blocked on endpoints and also give insight into the type of attacks being targeted towards a computing system. These may be measured by the total number of blocks and removals per endpoint in the computing system. Patch profile may, for example, be a measurement of how computing systems internally patch software.

Metrics of external data may include, but are not limited to, port profiles, vulnerability profiles, end of life products hosted, network misconfigurations (such as misconfigurations of certificates or mail servers), password leak exposure, software vendor profiles, or source code exposure. Metrics of business data may include, but are not limited to, physical location, industry of operation, an existence and number subsidiaries, revenue, and employee count.

At operation 220, a clustering algorithm is executed on the obtained data to determine clusters for the plurality of computing systems. The clustering algorithm may be any suitable algorithm capable of clustering data points. For example, the clustering algorithm may be a hierarchical density-based spatial clustering algorithm. Density-based spatial clustering refers to clustering methods that define clusters as areas of relative high-density when data points are plotted. Hierarchical density-based spatial clustering refers to methods which differentiate clusters based on relative density of the clusters. The clustering algorithm may be able to cluster a data set without previously knowing a number of clusters. Clusters may be determined to group different computing systems together that have similarities in external and internal data.

At operation 230, statistics are calculated for the obtained metrics, organized by cluster. For example, for a first cluster, statistics for obtained metrics may be calculated. The same may be performed for a second cluster, as well as other clusters generated at operation 220. Statistics generated for each metric may include mean, median, standard deviation, outlier score, and/or probability of occurrence for that metric.

Figure 2B:
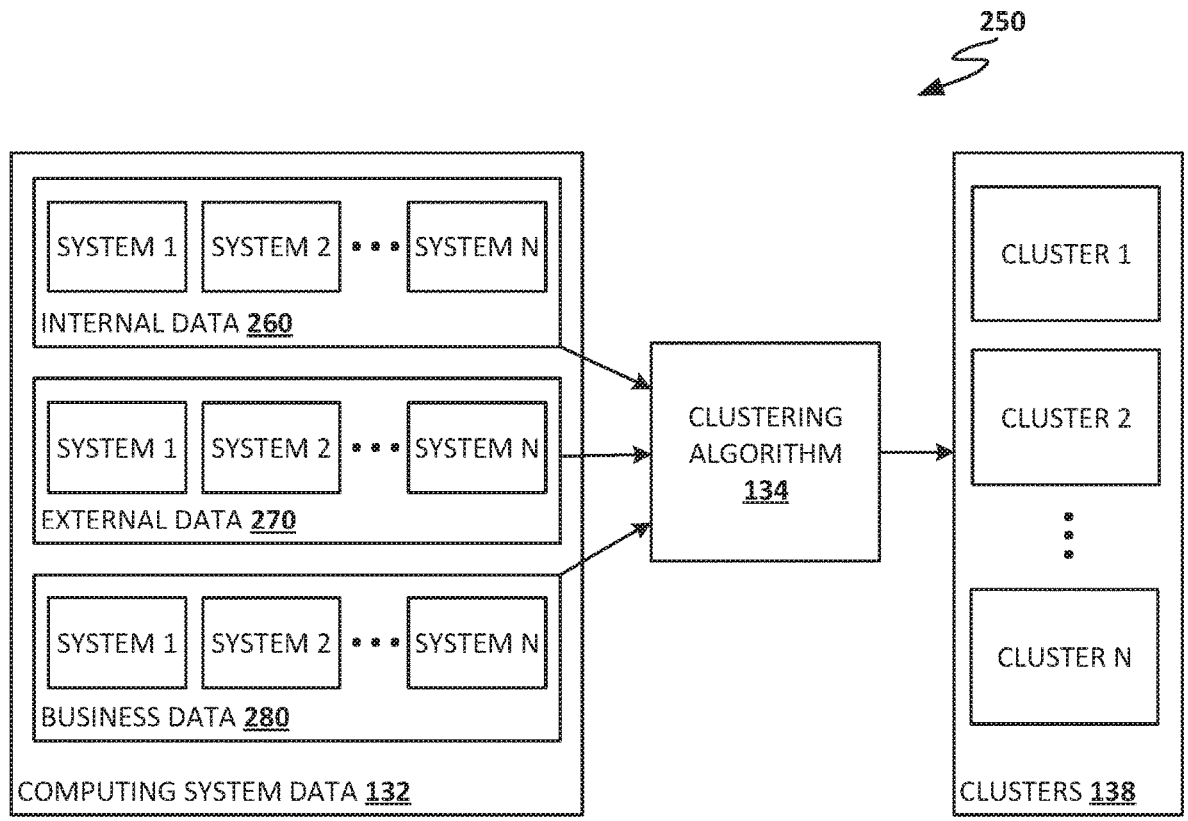
FIG. 2B is a block diagram of components of a predictive system used for generating statistics for a cluster, according to an embodiment of the present disclosure.

FIG. 2B is a block diagram of components of a predictive system 250 used for generating cluster statistics, according to an embodiment of the present disclosure. Predictive system 250 may comprise part of a predictive agent, such as predictive agent 130 of FIG. 1. Predictive system 250 may be used to perform process 200 of FIG. 2A. Predictive system 250 includes computing system data 132, clustering algorithm 134, and clusters 138.

Computing system data includes internal data 260, external data 270, and business data 280, which each include data for a plurality of existing computing systems, shown here as N systems numbered 1 to N. Internally-viewable data of system 1 is stored in internal data 260, while externally-viewable data of system 1 is stored in external data 270 and business data 280. The collection of internal data 260, external data 270, and business data 280 may correspond to operation 210 of FIG. 2A. Collecting computing system data 132 may be performed periodically, such as monthly, in order to maintain up-to-date values for computing system data 132, and thus, clusters 138.

Clustering algorithm 134 uses internal data 260, external data 270, and business data 280 to create clusters 138. Clustering algorithm 134 generally organizes each system represented in computing system data 132 into a cluster of clusters 138. Clusters 138 include a plurality of clusters, shown here as N clusters numbered 1 to N. The number of clusters in clusters 138 may be dependent on the relative similarities or differences in the N systems. For example, clusters 138 may have relatively few clusters if the N systems are relatively similar, while clusters 138 may have relatively many clusters if the N systems are relatively different. Clustering algorithm 134 generating clusters 138 from computing system data 132 may correspond to operation 220 of FIG. 2A.

After generating clusters 138, statistics may be generated for the internal, external, and business data of each cluster numbered 1 to N. That is, for each cluster, statistics are calculated based on the data of the systems in that cluster. For example, assume systems 1 and 2 are organized into cluster 1, and are the only systems categorized into that cluster. To calculate internal statistics, such as median or mean, for cluster 1, internal data for both systems 1 and 2 may be obtained. For example, given the metric "remediation time" for systems 1 and 2, a mean value may be established for the overall "remediation time" for cluster 1. Statistics for each metric of internal data may be similarly calculated. The end result is that statistical values for internal data may be established for cluster 1 as a whole. The calculation of cluster statistics may correspond to operation 210 of FIG. 2A.

Figure 3A:
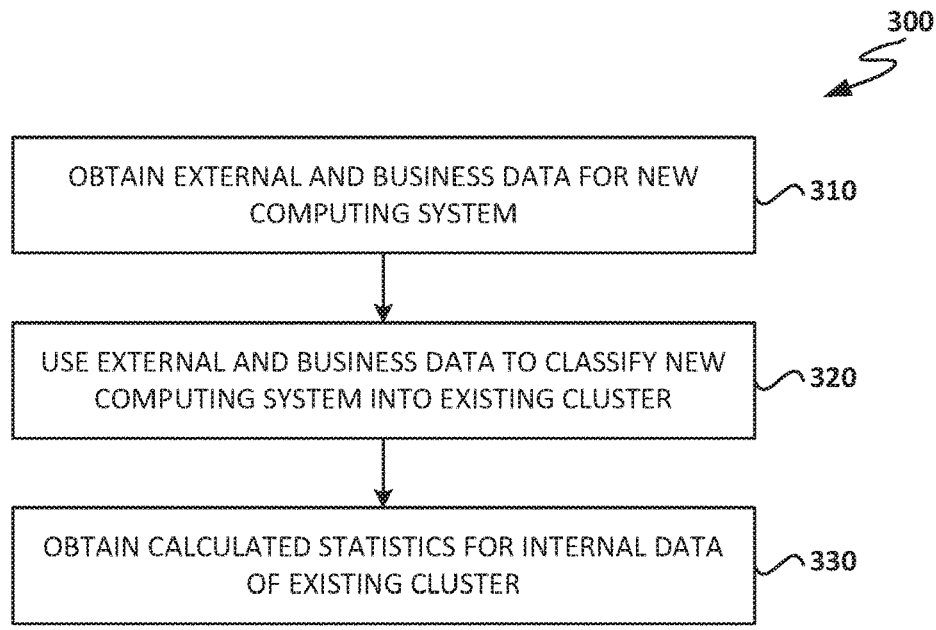
FIG. 3A illustrates an example process for obtaining estimates of internal data for a new computing system, according to an embodiment of the present disclosure.

FIG. 3A illustrates an example process 300 for obtaining estimates of internal data for a new computing system, according to an embodiment of the present disclosure. Process 300 may be used after receiving a request for internal data estimates of a new computing system. Process 300 begins at operation 310, where external data and business data of the new computing system are obtained. External and business data may be the only available information available associated with the new computing system. That is, internal data may be unavailable for the new computing system.

At operation 320, the external and business data are used to classify the new computing system into an existing cluster, such as a cluster of clusters 138 of FIG. 1. Classification of the new computing system may be performed, for example, by any machine learning classification model capable of classifying newly available data into existing categories of data. Clusters may constitute such a category of data. Suitable classification models may include classification models employing gradient boosting. Gradient boosting is a machine learning method that performs boosting (improving learner performance using weak learners) using techniques similar to gradient descent optimization. One such classification model may be XGBoost, which provides a gradient boosting framework for various programming languages.

At operation 330, calculated statistics may be obtained for internal data associated with the existing cluster into which the new computing system was classified. The calculated statistics may correspond to cluster statistics such as those generated by process 200 of FIG. 2A. In general, cluster statistics may represent suitable estimates for internal data of the new computing system. In addition to a complete set of internal data for the new computing system, individual metrics of internal data may also be obtained. For example, a requester of internal data of the new computing system may in fact be interested in only a single metric of internal data.

Figure 3B:
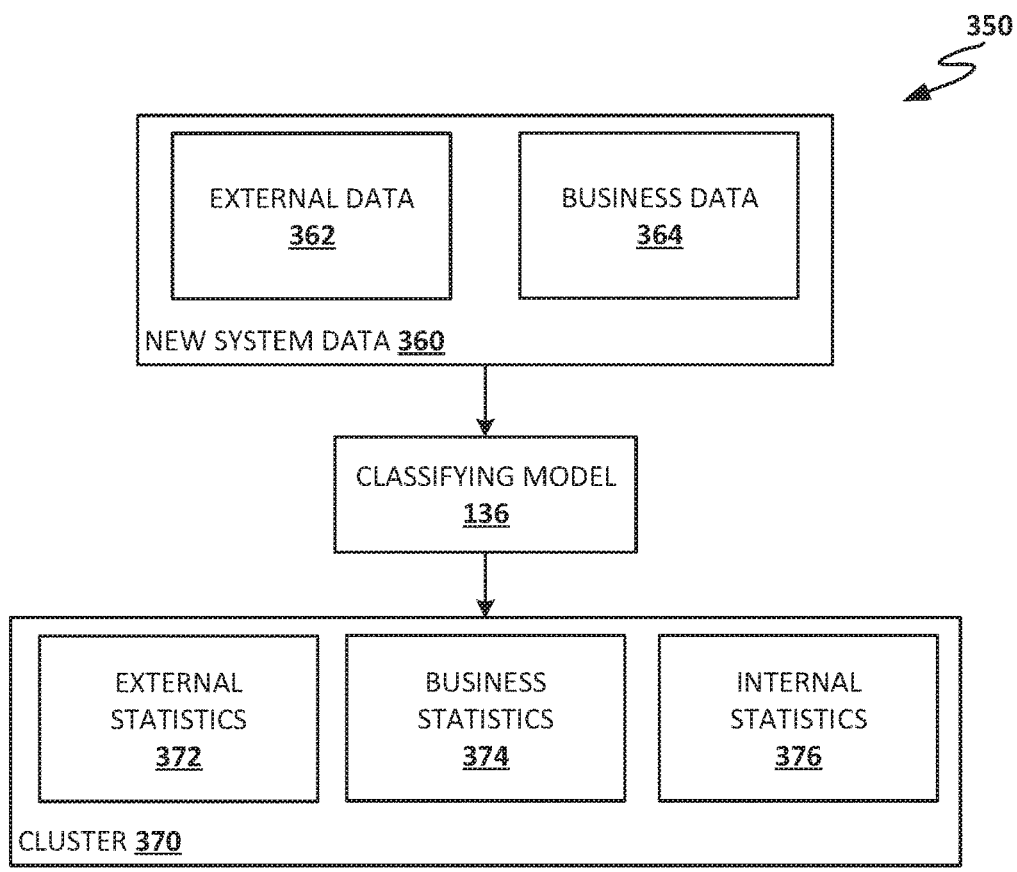
FIG. 3B is a block diagram of components of a predictive system used for obtaining estimates of internal data for a new computing system, according to an embodiment of the present disclosure.

FIG. 3B is a block diagram of components of a predictive system 350 used for obtaining estimates of internal data for a new computing system, according to an embodiment of the present disclosure. Predictive system 350 may comprise part of a predictive agent, such as predictive agent 130 of FIG. 1. Predictive system 350 may be used to perform process 300 of FIG. 2B. Predictive system 350 includes new system data 360, classifying model 136, and cluster 370. After receiving a request for internal data of a new computing system, new system data 360 may be collected. New system data 360 includes external data 362 and business data 364. Generally, both external data 362 and business data 364 may be viewable and obtainable by those outside of the new computing system. Obtaining new system data 360 may correspond to operation 310 of FIG. 3A.

Classifying model 136 may classify the new computing system, based on external data 362 and business data 364, into an existing cluster. In this example, the new computing system is classified into cluster 370. Cluster 370 includes external statistics 372, business statistics 374, and internal statistics 376. Statistics 372, 374, 376 may be calculated by a process, such as process 200 of FIG. 2A.

Generally, a computing system may be classified into an existing cluster based on similarities between the external and business data of a computing system and external and business statistics of the cluster. In this case, external data 362 may be similar to external statistics 372, and business data 364 may be similar to business statistics 374. Classifying the new computing system into cluster 370 may correspond with operation 320 of FIG. 3A.

Once the new computing system is classified into cluster 370, internal statistics 376 may be obtained from cluster 370 and used as estimate for internal data of the new computing system. Internal statistics 376 may represent a good estimate of internal data for the new computing system, because of the similarity of the external and business data of the new computing system to other computing systems in cluster 370. Generally, two computing systems with largely similar external and business data may also have largely similar internal data, as well. When a single computing system can be compared to a larger range of similar computing systems, a resulting estimate of internal data of the single computing system based on the internal data of the similar computing systems may be better. Obtaining internal statistics 376 may correspond to operation 330 of FIG. 3A.

Figure 4:
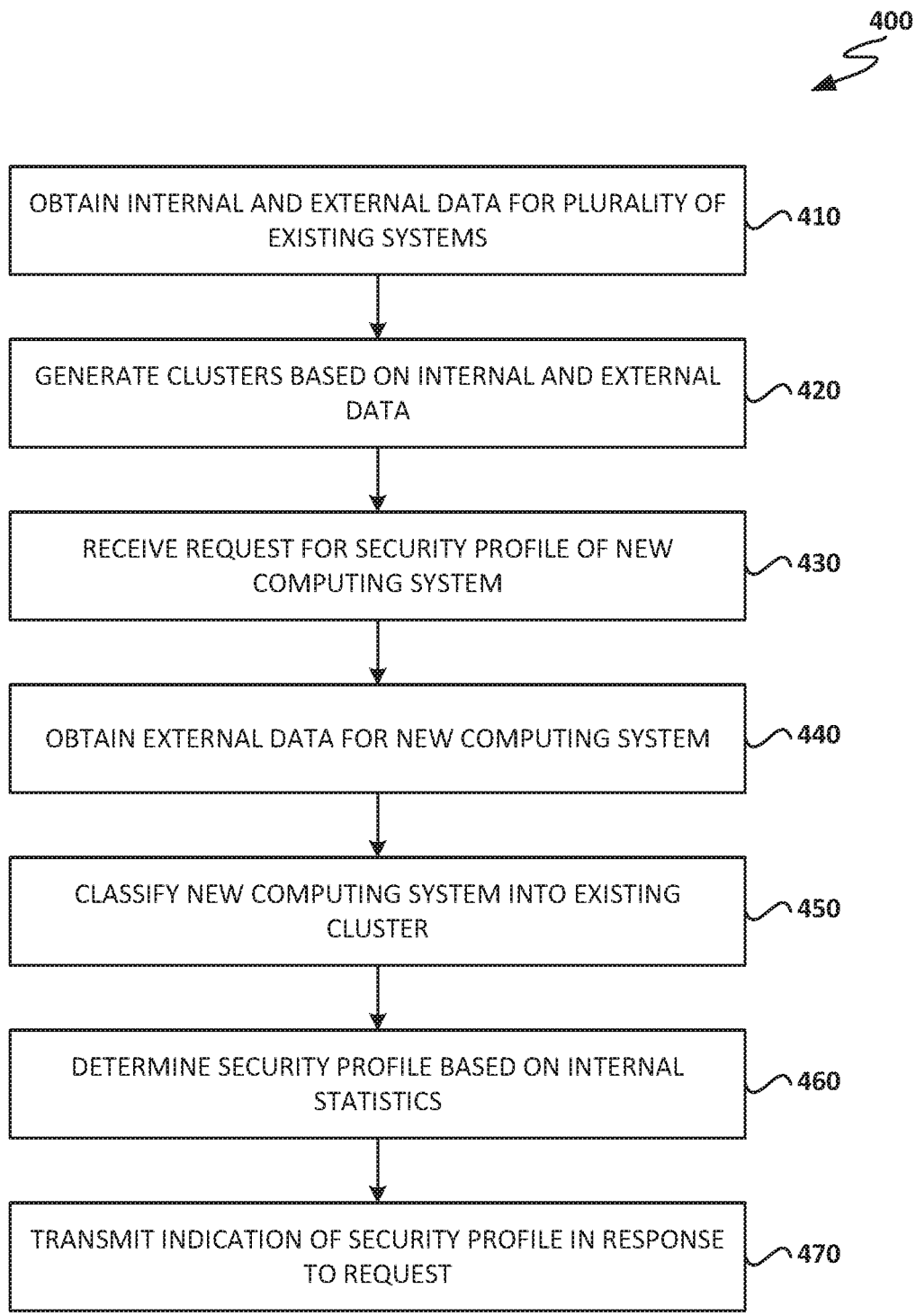
FIG. 4 is a flow diagram of an example process for generating a security profile for a new computing system, according to an embodiment of the present disclosure.

FIG. 4 is a flow diagram of an example process 400 for generating a security profile for a computing system, according to an embodiment of the present disclosure. Process 400 may be performed by a predictive agent executing on a security server, such as predictive agent 130 of FIG. 1. Process 400 begins at operation 410, where information associated with a plurality of existing computing systems, including external data and internal data, is obtained over a network. Information collected may be normalized over the number of data points collected for. That is, for the internal data metric "installation of hacking tools" the metric may be collected relative to the number of computing devices or endpoints in the computing system.

At operation 420, a set of clusters (e.g., clusters 138) is generated by a clustering algorithm (e.g., clustering algorithm 134) based on the information associated with the plurality of existing computing systems. Because the security information of the existing computing systems may change over time, the clusters may be updated to reflect changes in the existing computing systems. Thus, collection of information and generation of clusters may be performed periodically, such as monthly, or intermittently with an acceptable delay between collection times.

At operation 430, a request for a security profile of a new computing system (e.g., new computing system 160) is received. The request may be received over a network (e.g., network 110). The security profile may be based on security information of the new computing system, including internal data of the new computing system. If internal data is unavailable for the new computing system, estimates of the internal data may instead be obtained. In other embodiments, the request may instead be for specific elements or metrics of internal data of the new computing system. For example, a requesting entity may be interested in only a single metric, or a subset of internal data, rather than all internal data metrics.

At operation 440, external data associated with the new computing system is obtained. At operation 450, the new computing system is classified into an existing cluster of the set of clusters based on the external data associated with the new computing system. Business data of the new computing system may be collected in addition to the external data, and used to further refine the classification of the new computing system to the existing cluster. Classification of the new computing system may be carried out by a classification model (e.g., classifying model 136).

At operation 460, the security profile is determined based on internal statistics associated with the first cluster. Generally, statistics for internal data are prepared for each cluster of the set of clusters. The statistics may include measures for various metrics of internal data of existing computing systems clustered together. For example, a mean of a given metric of internal data may be prepared. At operation 470, an indication of the security profile is transmitted over the network.

Figure 5:
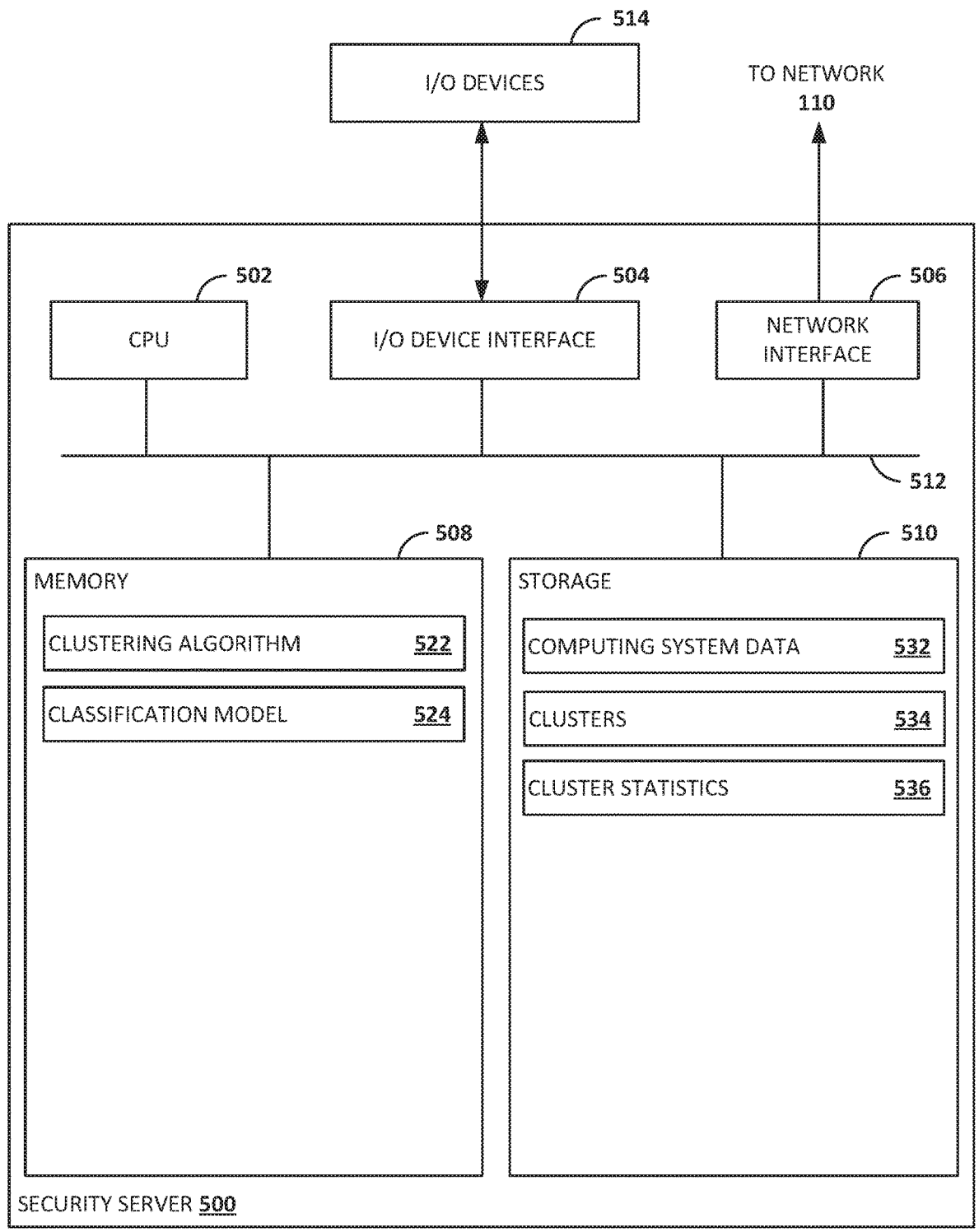
FIG. 5 is a block diagram of an example security server, according to an embodiment of the present disclosure.

FIG. 5 is a block diagram of an example security server 500, according to an embodiment of the present disclosure. As shown, the security server 500 includes, without limitation, central processing unit (CPU) 502, one or more input/output (I/O) device interfaces 504, which may allow for the connection of various I/O devices 514 (e.g., keyboards, displays, mouse devices, pen input, etc.) to the security server 500, network interface 506, memory 508, storage 510, and interconnect 512.

CPU 502 may retrieve and execute programming instructions stored in the memory 508. Similarly, CPU 502 may retrieve and store application data residing in memory 508. Interconnect 512 transmits programming instructions and application data, among CPU 502, I/O device interface 504, network interface 506, memory 508, and storage 510. CPU 502 is included to be representative of a single CPU, multiple CPUs, a single CPU having multiple processing cores, and the like. I/O device interface 504 may provide an interface for capturing data from one or more input devices integrated into or connected to security server 500, such as keyboards, mice, touchscreens, and so on. Memory 508 may represent a random access memory (RAM), while storage 510 may be a solid state drive, for example. Although shown as a single unit, storage 510 may be a combination of fixed and/or removable storage devices, such as fixed drives, removable memory cards, network attached storage (NAS), or cloud-based storage.

As shown, memory 508 includes clustering algorithm 522 and classification model 524. Clustering algorithm 522 and classification model 524 may correspond to clustering algorithm 134 and classifying model 136 of FIG. 1, respectively. Clustering algorithm 522 and classification model 524 may both be executed based on instructions stored in the storage 510. Such instructions may be executed by the CPU 502.

As shown, storage 510 includes computing system data 532, clusters 534, and cluster statistics 536. Computing system data 532 and clusters 534 may correspond to computing system data 132 and clusters 138 of FIG. 1, respectively. Cluster statistics 536 may correspond to statistics 372, 374, 376 of FIG. 3B.

One embodiment of the present disclosure provides a method for generating a security profile for a new computing system. The method generally includes obtaining, over a network, information associated with a plurality of existing computing systems and generating, by a clustering algorithm, a set of clusters based on the information associated with the plurality of existing computing systems. The information may include, for example, external data and internal data. The method further comprises obtaining external data associated with the computing system and classifying the computing system into a cluster in the set of clusters based on the external data associated with the computing system. The method further comprises determining the security profile based on statistics associated with the cluster and transmitting, over the network, an indication of the security profile.

According to some embodiments, the clustering algorithm is a hierarchical density-based spatial clustering algorithm.

According to some embodiments, classifying the computing system into the cluster in the set of clusters based on the external data associated with the computing system further comprises classifying, by a classification model using gradient boosting, the computing system into the cluster in the set of clusters based on the external data associated with the computing system According to some embodiments, the method further involves obtaining updated information associated with the plurality of existing computing systems and updating the set of clusters based on the updated information associated with the plurality of existing computing systems. The updated information may include, for example, updated external data and/or updated internal data.

According to some embodiments, the statistics associated with the cluster comprise at least one of: a mean, a median, a standard deviation, an outlier score or a probability of occurrence for a metric.

According to some embodiments, the information associated with an existing computing system of the plurality of existing computing systems is normalized based on a size of the existing computing system.

According to some embodiments, the information associated with a plurality of existing computing systems comprises external security metrics, business data, and internal security metrics.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments, and advantages are merely illustrative and are not considered elements or limitations of the appended claims except where explicitly recited in a claim. Likewise, reference to "the invention" shall not be construed as a generalization of any inventive subject matter disclosed herein and shall not be considered to be an element or limitation of the appended claims except where explicitly recited in a claim.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable medium(s) having computer-readable program code embodied thereon.

Any combination of one or more computer-readable mediums may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the current context, a computer-readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for generating a security profile for a computing system, comprising:
    obtaining, over a network, information associated with a plurality of existing computing systems, wherein the information associated with the plurality of existing computing systems comprises a first set of external data and a first set of internal security metrics, wherein the internal security metrics correspond to security details of a respective computing system viewable only inside the respective computing system, and wherein the external data includes external security metrics that correspond to security details of the respective computing system viewable outside of the respective computing system;
    generating, by a clustering algorithm, a set of clusters based on the information associated with the plurality of existing computing systems;
    obtaining a second set of external data associated with the computing system;
    classifying the computing system into a cluster in the set of clusters based on the second set of external data associated with the computing system;
    determining the security profile based on statistics associated with the cluster, wherein the statistics include a second set of internal security metrics estimated for the computing system; and
    transmitting, over the network, an indication of the security profile, wherein the security profile includes at least one internal security metric of the second set of internal security metrics.

2. The method of claim 1, wherein the clustering algorithm is a hierarchical density-based spatial clustering algorithm.

3. The method of claim 1, wherein classifying the computing system into the cluster in the set of clusters based on the external data associated with the computing system further comprises:
    classifying, by a classification model using gradient boosting, the computing system into the cluster in the set of clusters based on the external data associated with the computing system.

4. The method of claim 1, further comprising:
    obtaining updated information associated with the plurality of existing computing systems; and
    updating the set of clusters based on the updated information associated with the plurality of existing computing systems.

5. The method of claim 1, wherein the statistics associated with the cluster comprise at least one of:
    a mean;
    a median;
    a standard deviation;
    an outlier score; or
    a probability of occurrence for a metric.

6. The method of claim 1, wherein the information associated with an existing computing system of the plurality of existing computing systems is normalized based on a size of the existing computing system.

7. The method of claim 1, wherein the external data further comprise business data.

8. The method of claim 7, wherein the business data corresponds to business or company characteristics of an entity or company which owns or operates the respective computing system.

9. The method of claim 7, wherein the business data includes at least one of:
    physical location;
    industry of operation;
    an existence and number of subsidiaries;
    revenue; or
    employee count.

10. The method of claim 1, wherein the external security metrics include at least one of:
    port profiles;
    vulnerability profiles;
    end of life products hosted;
    network misconfigurations;
    password leak exposure;
    software vendor profiles; or
    source code exposure.

11. The method of claim 1, wherein the internal security metrics include at least one of:
    one or more counts of hacking tools;
    an effectiveness of remediation efficiency;
    typical remediation time in response to attacks;
    hygiene and blocking effectiveness;
    potential client-side vulnerabilities;
    readiness of response to security incidents; or
    a patch profile.

12. A computing device comprising:
    a processor; and
    a memory having instructions stored thereon which, when executed by the processor, perform operations for generating a security profile for a computing system, the operations comprising:
        obtaining, over a network, information associated with a plurality of existing computing systems, wherein the information associated with the plurality of existing computing systems comprises a first set of external data and a first set of internal security metrics, wherein the internal security metrics correspond to security details of a respective computing system viewable only inside the respective computing system, and wherein the external data includes external security metrics that correspond to security details of the respective computing system viewable outside of the respective computing system;
        generating, by a clustering algorithm, a set of clusters based on the information associated with the plurality of existing computing systems;
        obtaining a second set of external data associated with the computing system;
        classifying the computing system into a cluster in the set of clusters based on the second set of external data associated with the computing system;
        determining the security profile based on statistics associated with the cluster, wherein the statistics include a second set of internal security metrics determined for the computing system; and
        transmitting, over the network, an indication of the security profile, wherein the security profile includes at least one internal security metric of the second set of internal security metrics.

13. The computing device of claim 12, wherein the clustering algorithm is a hierarchical density-based spatial clustering algorithm.

14. The computing device of claim 12, wherein classifying the computing system into the cluster in the set of clusters based on the external data associated with the computing system further comprises:
   classifying, by a classification model using gradient boosting, the computing system into the cluster in the set of clusters based on the external data associated with the computing system.

15. The computing device of claim 12, the operations further comprising:
   obtaining updated information associated with the plurality of existing computing systems; and
   updating the set of clusters based on the updated information associated with the plurality of existing computing systems.

16. The computing device of claim 12, wherein the statistics associated with the cluster comprise at least one of:
   a mean;
   a median;
   a standard deviation;
   an outlier score; or
   a probability of occurrence for a metric.

17. The computing device of claim 12, wherein the information associated with an existing computing system of the plurality of existing computing systems is normalized based on a size of the existing computing system.

18. The computing device of claim 12, wherein the external data further comprise business data.

19. A non-transitory computer-readable medium having instructions stored thereon which, when executed by a processor of a computing device, perform operations for generating a security profile for a computing system, the operations comprising:
   obtaining, over a network, information associated with a plurality of existing computing systems, wherein the information associated with the plurality of existing computing systems comprises a first set of external data and a first set of internal security metrics, wherein the internal security metrics correspond to security details of a respective computing system viewable only inside the respective computing system, and wherein the external data includes external security metrics that correspond to security details of the respective computing system viewable outside of the respective computing system;
   generating, by a clustering algorithm, a set of clusters based on the information associated with the plurality of existing computing systems;
   obtaining a second set of external data associated with the computing system;
   classifying the computing system into a cluster in the set of clusters based on the second set of external data associated with the computing system;
   determining the security profile based on statistics associated with the cluster, wherein the statistics include a second set of internal security metrics determined for the computing system; and
   transmitting, over the network, an indication of the security profile, wherein the security profile includes at least one internal security metric of the second set of internal security metrics.

20. The computer-readable medium of claim 19, wherein the external data further comprises business data.

* * * * *